United States Patent
Mimuro (10) Patent No.: US 11,114,811 B2
(45) Date of Patent: Sep. 7, 2021

(54) MULTIMODE FIBER, OPTICAL AMPLIFIER, AND FIBER LASER (71) Applicant: FUJIKURA LTD., Tokyo (JP)

(72) Inventor: Masakuni Mimuro, Tokyo (JP)

(73) Assignee: FUJIKURA LTD., Tokyo (JP)

(*) Notice: Subject to any disclaimer, the term of this patent is extended or adjusted under 35 U.S.C. 154(b) by 0 days.

(21) Appl. No.: 16/611,052

(22) PCT Filed: Apr. 24, 2018

(86) PCT No.: PCT/JP2018/016658
§ 371 (c)(1),
(2) Date: Nov. 5, 2019

(87) PCT Pub. No.: WO2018/207615
PCT Pub. Date: Nov. 15, 2018

(65) Prior Publication Data
US 2020/0161826 A1 May 21, 2020

(30) Foreign Application Priority Data
May 8, 2017 (JP) .............................. JP2017-092278

(51) Int. Cl.
H01S 3/067 (2006.01)
H01S 3/094 (2006.01)
H01S 3/16 (2006.01)

(52) U.S. Cl.
CPC ...... H01S 3/06708 (2013.01); H01S 3/06779 (2013.01); H01S 3/094069 (2013.01); H01S 3/1603 (2013.01)

(58) Field of Classification Search
CPC .......... H01S 3/094069; H01S 3/08022; H01S 3/0804; H01S 3/067–06795; H01S 3/08018; G02B 6/02023
See application file for complete search history.

(56) References Cited

U.S. PATENT DOCUMENTS 4,959,837 A * 9/1990 Fevrier ............... H01S 3/06708
359/341.1
5,414,725 A * 5/1995 Fermann ................. H01S 3/067
372/18
(Continued)

FOREIGN PATENT DOCUMENTS

CN 101408641 A * 4/2009
CN 101408641 A 4/2009
(Continued)

OTHER PUBLICATIONS

Bai et al., "Multimode Fiber Amplifier with Tunable Modal Gain Using a Reconfigurable Multimode Pump", Aug. 15, 2011, Optics Express, vol. 19, No. 17, 16601-16611 (Year: 2011).*
(Continued)

Primary Examiner — Joshua King
(74) Attorney, Agent, or Firm — Westerman, Hattori, Daniels & Adrian, LLP (57) ABSTRACT An object is to improve the efficiency of amplification by rare earth ion while maintaining beam quality of output light in a multi-mode fiber doped with rare earth ion. A multi-mode fiber (11) that includes a rare-earth-ion-doped core and that has a normalized frequency of not less than 2.40 includes a filter portion (111) that is formed by bending a partial section of or entirety of the multi-mode fiber (11), the filter portion (111) having a smallest diameter (diameter R1) that is set so that (1) only LP01, LP11, LP21, and LP02 modes propagate or only LP01 and LP11 modes propagate and (2) a loss of a highest-order one of the modes that propagate is not more than 0.1 dB/m.

10 Claims, 5 Drawing Sheets

(56) References Cited

U.S. PATENT DOCUMENTS

| | | | |
|---|---|---|---|
| 6,496,301 B1* | 12/2002 | Koplow | G02B 6/14 |
| | | | 359/337 |
| 8,532,150 B1* | 9/2013 | Tong | H01S 3/06758 |
| | | | 372/6 |
| 10,175,420 B2* | 1/2019 | Wood | H01S 3/302 |
| 10,871,611 B2* | 12/2020 | Sillard | G02B 6/03644 |
| 2002/0164140 A1* | 11/2002 | Lysiansky | G02B 6/03644 |
| | | | 385/127 |
| 2008/0095199 A1* | 4/2008 | Abramczyk | G02B 6/105 |
| | | | 372/6 |
| 2010/0008634 A1* | 1/2010 | Guertin | C03B 37/01222 |
| | | | 385/126 |
| 2011/0058250 A1* | 3/2011 | Liu | H01S 3/06754 |
| | | | 359/341.3 |
| 2011/0097049 A1* | 4/2011 | Gapontsev | G02B 6/02023 |
| | | | 385/127 |
| 2011/0228382 A1* | 9/2011 | Mattsson | H01S 3/094007 |
| | | | 359/341.3 |
| 2013/0044768 A1* | 2/2013 | Ter-Mikirtychev | |
| | | | H01S 3/0092 |
| | | | 372/5 |
| 2013/0230290 A1* | 9/2013 | Evans | G02B 6/03627 |
| | | | 385/124 |
| 2013/0251323 A1* | 9/2013 | Mukasa | G02B 6/02004 |
| | | | 385/123 |
| 2014/0063592 A1 | 3/2014 | Ip | |
| 2015/0077837 A1* | 3/2015 | Abedin | H01S 3/06716 |
| | | | 359/341.5 |
| 2016/0268757 A1* | 9/2016 | Hosokawa | H01S 3/06766 |
| 2017/0146733 A1* | 5/2017 | Wood | H01S 3/302 |
| 2017/0162999 A1* | 6/2017 | Saracco | H01S 3/06754 |

FOREIGN PATENT DOCUMENTS

| | | | | |
|---|---|---|---|---|
| CN | 101615760 A | * | 12/2009 | |
| CN | 101615760 A | | 12/2009 | |
| JP | 2004-349629 A | | 12/2004 | |
| JP | 2006-516811 A | | 7/2006 | |
| JP | 2010-3896 A | | 1/2010 | |
| JP | 2014-86599 A | | 5/2014 | |
| JP | 2014170850 A | * | 9/2014 | |
| JP | 6005472 B2 | * | 10/2016 | |
| JP | 6005472 B2 | | 10/2016 | |
| JP | 6059560 B2 | | 1/2017 | |
| JP | 2017-41515 A | | 2/2017 | |
| WO | 2013/145141 A1 | | 10/2013 | |
| WO | 2015/087983 A1 | | 6/2015 | |
| WO | WO-2016167083 A1 | * | 10/2016 | G02B 6/02314 |

OTHER PUBLICATIONS

Notification of Transmittal of Translation of the International Preliminary Report on Patentabililty (Form PCT/IB/338) issued in counterpart International Application No. PCT/JP2018/016658 dated Nov. 21, 2019 with Forms PCT/IB/373 and PCT/ISA/237, with English translation (10 pages).

International Search Report dated Jul. 17, 2018, issued in counterpart Application No. PCT/JP2018/016658 (2 pages).

Koplow, Jeffrey P. et al., "Single-mode operation of a coiled multimode fiber amplifier", Optics Letters, Apr. 1, 2000, vol. 25, No. 7, pp. 442-444.

Office Action dated Sep. 1, 2020, issued in counterpart CN Application No. 201880030076.5, with English translation (12 pages).

* cited by examiner

MULTIMODE FIBER, OPTICAL AMPLIFIER, AND FIBER LASER

TECHNICAL FIELD

The present invention relates to a multi-mode fiber that has a rare-earth-ion-doped core. The present invention also relates to an optical amplifier and a fiber laser each including such a multi-mode fiber.

BACKGROUND ART

An optical amplifier that includes, as an optical amplifier fiber, a multi-mode fiber whose core is doped with rare earth ions acting as an excitation substance has been used in industry for the purpose of increasing the output power of output beam. A fiber laser that includes such an optical amplifier is capable of outputting high-power laser light. Such a fiber laser is therefore used in material processing applications such as cutting and welding.

When such a fiber laser is used in material processing applications, the fiber laser is required to output high-power laser light with a small beam waist diameter (cross sectional diameter) in order to improve processing accuracy. That is, such a fiber laser is required to output high-power laser light that has high beam quality. The beam quality is an indicator that indicates to what degree the beam waist diameter can be reduced. Beam parameter product (BPP) or $M^2$ is used as the beam quality.

Figure 1:
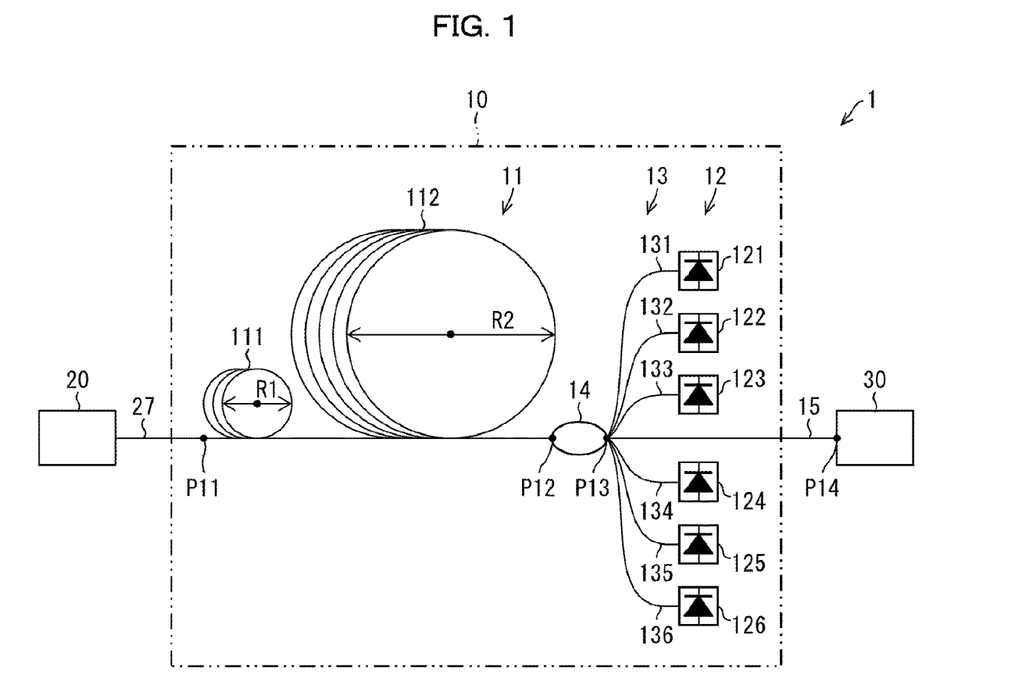
FIG. 1 is a block diagram illustrating a configuration of a fiber laser that includes a multi-mode fiber in accordance with Embodiment 1 of the present invention.

Patent Literature 1 shows, in FIG. 1, a fiber laser that includes: an optical amplifier fiber (i.e., excitation optical fiber in Patent Literature 1); a plurality of excitation light entrance means; and a mode filter, for the purpose of obtaining high-quality, high-power laser light. The optical amplifier fiber has a core doped with an excitation substance, which is to be excited upon receipt of excitation light that is inputted from the excitation light entrance means. The optical amplifier fiber functions as a resonator that causes laser oscillation, and amplifies the power of that laser light. As such, the fiber laser arranged as described above has the function of an optical amplifier.

The fiber laser of Patent Literature 1 employs, as the excitation optical fiber, a photonic crystal fiber that has a large mode field diameter. This photonic crystal fiber having a large mode field diameter functions as a multi-mode fiber (MMF). With this, even in a case where high-power excitation light is inputted through a plurality of excitation light entrance means, the excitation light is prevented from becoming too dense within the excitation optical fiber. Thus, according to this arrangement, it is possible to prevent the excitation optical fiber from being damaged by excessive heat. That is, this excitation optical fiber is capable of outputting high-power, multi-mode laser light.

Furthermore, this fiber laser employs, as the mode filter, a photonic crystal fiber that is provided at a certain position of the excitation optical fiber. The mode filter allows passage of only light in the fundamental mode and is capable of blocking light in higher-order modes. Thus, according to this arrangement, it is possible to selectively output only laser light in the fundamental mode which is part of the multi-mode laser light obtained through the excitation optical fiber. That is, it is possible to output laser light having high beam quality.

As described above, the fiber laser of Patent Literature 1 is capable of outputting high-power laser light that has high beam quality.

Patent Literature 1 also discloses that it is possible to change the oscillation mode of an optical fiber to a single mode by forming a bend loss by bending the optical fiber. This means that the formation of a bend loss makes it possible to improve the beam quality of laser light outputted by a fiber laser.

CITATION LIST

Patent Literature

[Patent Literature 1]
Japanese Patent Application Publication, Tokukai, No. 2010-3896 (Publication date: Jan. 7, 2010)

SUMMARY OF INVENTION

Technical Problem

The fiber laser disclosed in Patent Literature 1, however, still has room to improve in terms of amplification efficiency, for the following reason.

According to the fiber laser disclosed in Patent Literature 1, (1) the excitation optical fiber amplifies both the laser light in the fundamental mode and the laser light in the higher-order modes without distinction between them and (2) the mode filter achieves laser light having high beam quality by removing, from amplified laser light in the fundamental mode and amplified laser light in the higher-order modes, the amplified laser light in the higher-order modes. This indicates that, according to the fiber laser disclosed in Patent Literature 1, the power of excitation light that has contributed to the amplification of the laser light in the higher-order modes, which is part of the power of the excitation light that has entered the excitation optical fiber from the plurality of excitation light entrance means, is abandoned without contributing to the power of laser light outputted from the fiber laser.

Furthermore, the fiber laser disclosed in Patent Literature 1 employs a bent optical fiber instead of the mode filter. The oscillation mode of an optical fiber can be changed to a single mode by forming a bend loss by bending the optical fiber, and this in turn makes it possible to improve the beam quality of laser light. The fiber laser disclosed in Patent Literature 1, however, still has room to improve in terms of amplification efficiency, for the following reason.

Laser light in the fundamental mode is distributed in a concentrated manner at and around the center of the core of an optical fiber. Therefore, among rare earth ions in the core of the optical fiber, only those distributed at and around the center of the core contribute to optical amplification. In other words, rare earth ions distributed near the outer periphery of the core do not contribute to optical amplification. On the contrary, excitation light, after entering the optical fiber, excites both the rare earth ions distributed at and around the center of the core and the rare earth ions distributed near the outer periphery of the core without distinction between them. It follows that the power of excitation light that has been used to excite the rare earth ions near the outer periphery of the core, which is part of the power of the excitation light that has entered the optical fiber, ends up being dissipated uselessly without contributing to the power of laser light outputted from the fiber laser.

The present invention was made in view of the above issues, and an object thereof is to, in a multi-mode fiber that has a rare-earth-ion-doped core, improve the efficiency of amplification by rare earth ions while maintaining the beam quality of output light.

Solution to Problem

In order to attain the above object, a multi-mode fiber in accordance with an aspect of the present invention is a multi-mode fiber that includes a rare-earth-ion-doped core and that has a normalized frequency of not less than 2.40, the multi-mode fiber including a filter portion that is formed by bending a partial section of or entirety of the multi-mode fiber, the filter portion having a smallest diameter that is set so that (1) only LP01, LP11, LP21, and LP02 modes propagate or only LP01 and LP11 modes propagate and (2) a loss of a highest-order one of the modes that propagate is not more than 0.1 dB/m.

Advantageous Effects of Invention

An aspect of the present invention makes it possible to, in a multi-mode fiber that has a rare-earth-ion-doped core, improve the efficiency of amplification by rare earth ions while maintaining the beam quality of output light.

DESCRIPTION OF EMBODIMENTS

Embodiment 1

Figure 2:
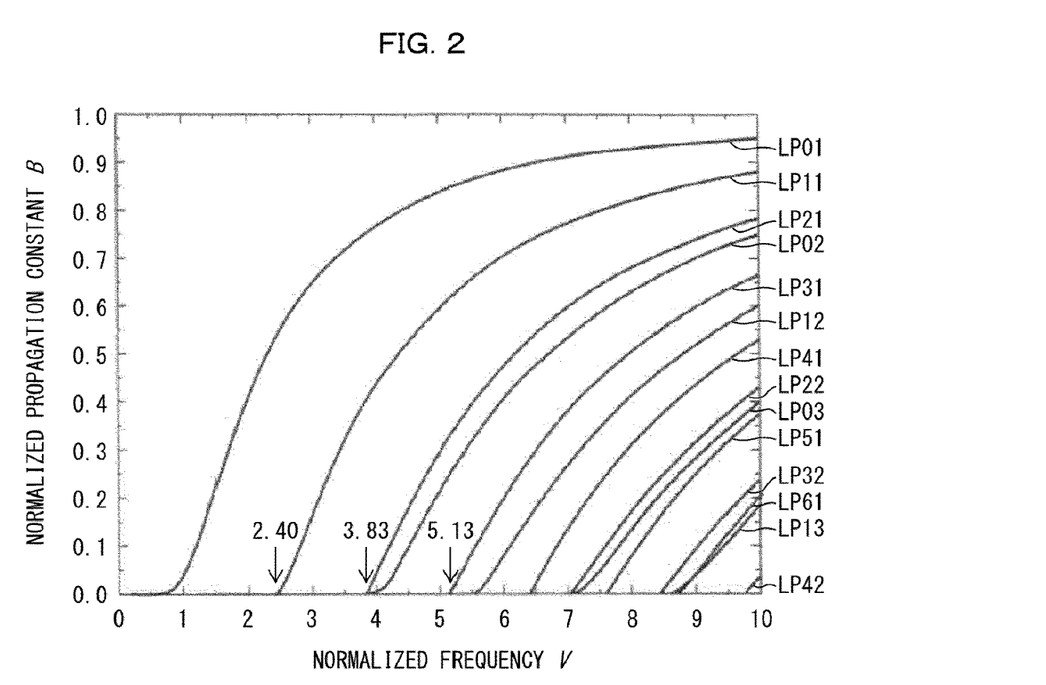
FIG. 2 is a chart showing normalized-frequency-dependence of normalized propagation constant of the multi-mode fiber.
Figure 3:
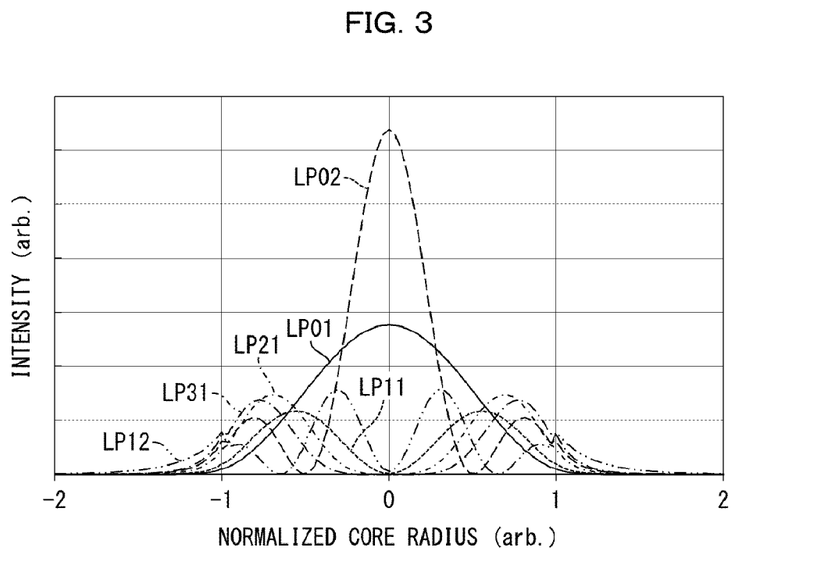
FIG. 3 is a chart showing intensity distribution of light in each mode at and around a core of the multi-mode fiber.
Figure 4:
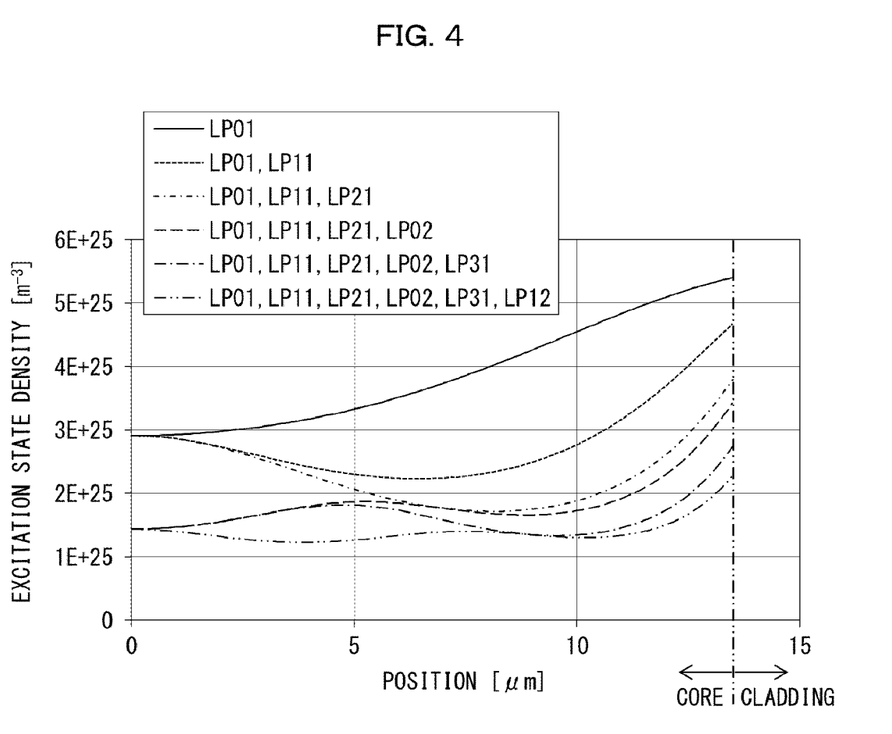
FIG. 4 is a chart showing excitation state density in the core of the multi-mode fiber.
Figure 5:
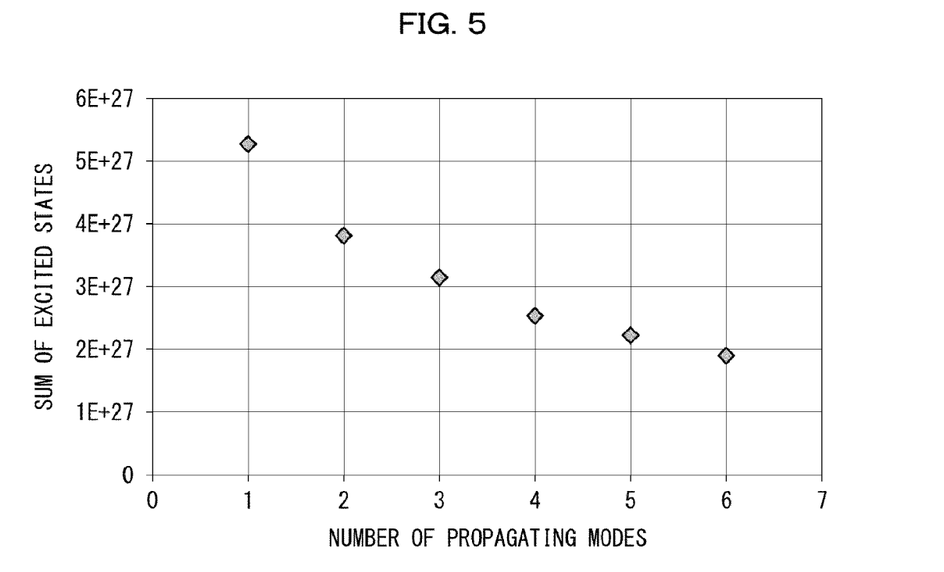
FIG. 5 is a chart showing correlations between the sum of excited states in the core of the multi-mode fiber and the number of modes of light propagating through the multi-mode fiber.

The following description will discuss a multi-mode fiber (MMF) in accordance with Embodiment 1 of the present invention, with reference to FIGS. 1 to 5. FIG. 1 is a block diagram illustrating a fiber laser 1 that includes an optical amplifier 10 that includes an MMF 11 in accordance with Embodiment 1. FIG. 2 is a chart showing normalized-frequency(V)-dependence of normalized propagation constant (B) of the MMF. FIG. 3 is a chart showing intensity distribution of light in each mode at and around the core of the MMF 11. FIG. 4 is a chart showing excitation state density in the core of the MMF 11. FIG. 5 is a chart showing correlations between the sum of excited states in the core of the MMF 11 and the number of modes of light propagating through the MMF 11.

(Overview of Fiber Laser 1)

As illustrated in FIG. 1, the fiber laser 1 includes the optical amplifier 10, a seed light source 20, and a head 30.

The seed light source 20 has an optical fiber 27 whose tip is fusion-spliced to an entrance end of the MMF 11 of the optical amplifier 10 at a junction point P11.

The optical amplifier 10 has a delivery fiber 15 whose tip is fusion-spliced to one end of the head 30 at a junction point P14. In the fiber laser 1 arranged like this, the optical amplifier 10 amplifies seed light supplied from the seed light source 20, and thereby outputs high-power laser light. The laser light outputted from the optical amplifier 10 is applied to a to-be-processed material via the head 30, which is connected downstream of the optical amplifier 10. Note that, in Embodiment 1, the seed light has a wavelength of 1090 nm. Therefore, the laser light outputted from the optical amplifier 10 also has a wavelength of 1090 nm. Note that the wavelength of the seed light and the laser light outputted from the optical amplifier 10 is not limited to 1090 nm.

The fiber laser 1 is capable of applying high-power laser light to a to-be-processed material via the head 30, and therefore is suitable for use in material processing applications such as cutting and welding.

The description in Embodiment 1 discusses the optical amplifier 10. The seed light source 20 will be described later in Embodiment 2. The head 30 can be any head that is used in material processing applications; therefore, the descriptions for the head 30 are omitted here.

(Optical Amplifier 10)

As illustrated in FIG. 1, the optical amplifier 10 includes the MMF 11, an excitation light source group 12, an optical fiber group 13, a combiner 14, and the delivery fiber 15. The excitation light source group 12 is made up of a plurality of laser diodes (LDs) 121 to 126 which are a plurality of excitation light sources. The optical fiber group 13 is made up of a plurality of optical fibers 131 to 136. Note that the number of excitation light sources and the number of optical fibers are each not limited to six, and can be selected as appropriate depending on a desired power of laser light and/or the like.

The MMF 11 is a step-index optical fiber which includes a core and a cladding, and the core is doped with rare earth ions ($Yb^{3+}$ ions in Embodiment 1) which act as an excitation substance. The MMF 11 is an optical fiber that allows propagation of not only the fundamental mode LP01 but also at least one higher-order mode. That is, the MMF 11 is a multi-mode fiber. The exit end of the MMF 11 is fusion-spliced to one end of the combiner 14 at a junction point P12.

One end of the optical fiber 131 is optically coupled to the LD 121, and the other end of the optical fiber 131 is fusion-spliced to the other end of the combiner 14 at a junction point P13. Similarly, one end of each of the optical fibers 132 to 136 is optically coupled to a corresponding one of the LDs 122 to 126. The other end of each of the optical fibers 132 to 136 is fusion-spliced to the other end of the combiner 14 at the junction point P13. As such, the optical amplifier 10 employs a backward-pumping arrangement. When the backward-pumping configuration is employed, the occurrence of amplified spontaneous emission can be reduced as compared to when a forward-pumping configuration is employed. Note that why the occurrence of amplified spontaneous emission can be reduced when the backward-pumping configuration is employed than when the forward-pumping configuration is employed will be described later.

Figure 8:
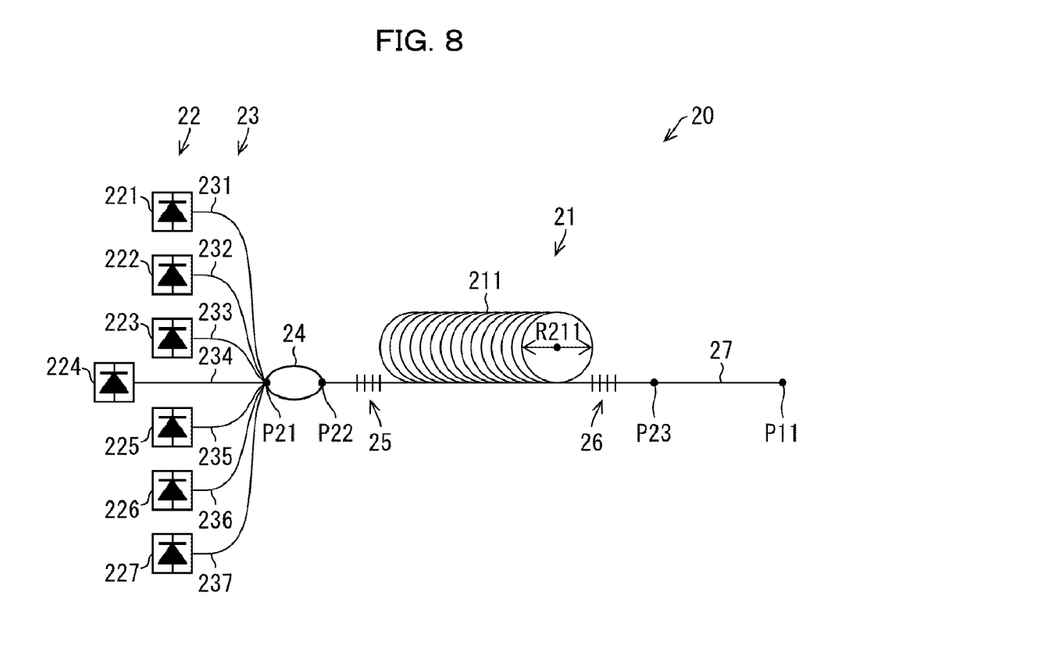
FIG. 8 is a block diagram illustrating a configuration of a seed light source that includes a multi-mode fiber in accordance with Embodiment 2 of the present invention.
Figure 9:
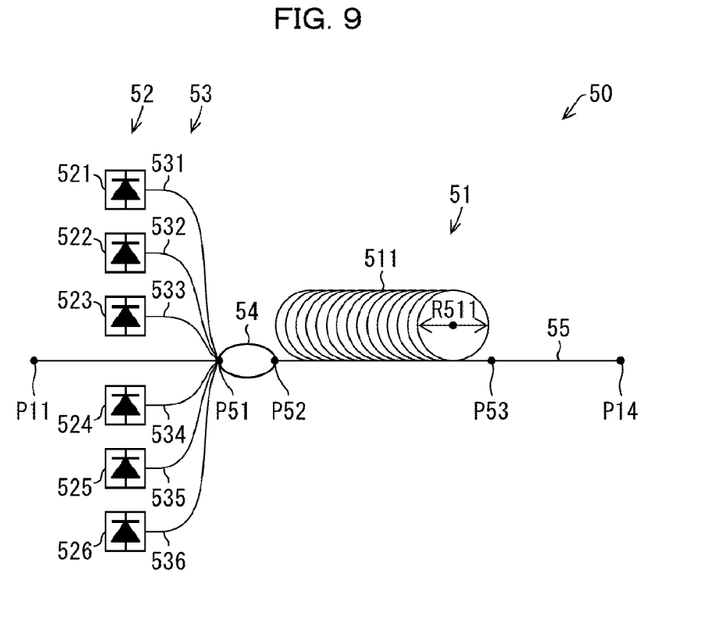
FIG. 9 is a block diagram illustrating a configuration of an optical amplifier that includes a multi-mode fiber in accordance with Embodiment 3 of the present invention.

Note, however, that an optical amplifier in accordance with an aspect of the present invention is not limited to a backward-pumping amplifier, and may be a forward-pumping amplifier as illustrated in FIGS. 8 and 9 or a bidirectional-pumping amplifier.

One end of the delivery fiber 15 is fusion-spliced to the other end of the combiner 14 at the junction point P13. The other end of the delivery fiber 15 is fusion-spliced to the one end of the head 30 at the junction point P14. The other end of the delivery fiber 15 corresponds to the foregoing tip of the delivery fiber 15.

In the optical amplifier 10 arranged as described above, excitation light outputted by the LDs 121 to 126 is supplied to the MMF 11 through the exit end via the optical fibers 131 to 136 and the combiner 14. The excitation light supplied to the MMF 11 propagates through the MMF 11 in a direction from the junction point P12 to the junction point P11 and, during the propagation, excites a large number of rare earth ions in the core of the MMF 11.

The core, which contains a large number of rare earth ions in their excited states, of the MMF 11 receives seed light at its one end. The seed light received by the MMF 11 propagates through the MMF 11 in a direction from the junction point P11 to the junction point P12. While propagating through the MMF 11, the seed light triggers radiative recombination of excited electrons of the rare earth ions. The seed light is thus amplified while propagating from the junction point P11 to the junction point P12 and becomes high-power laser light. The high-power laser light is supplied to the head 30 via the delivery fiber 15, and is applied to a to-be-processed material from the head 30.

(Overview of MMF 11)

The MMF 11 is a step-index optical fiber that includes a core and a cladding, and the core is doped with rare earth ions that act as an excitation substance. The MMF 11 is a double-clad fiber; however, the MMF 11 may be a single-clad fiber. The MMF 11 is an optical fiber that allows propagation of not only the fundamental mode LP01 but also at least one higher-order mode. That is, the MMF 11 is a multi-mode fiber.

<Number of Modes Propagating Through Optical Fiber>

The following first discusses the number of modes propagating through a step-index optical fiber, with reference to FIG. 2. The number of modes that can propagate through an optical fiber depends on normalized frequency V, which is defined by Equation (1). The normalized frequency V is one of the indicators that indicate specifications of an optical fiber.

$$V = ka\sqrt{n_{co}^2 - n_{cl}^2} \quad (1)$$

In Equation (1), $n_{co}$ represents the refractive index of a core, $n_{cl}$ represents the refractive index of a cladding, a represents the radius of the core, and k is a constant represented by $2\pi$ and the reciprocal of the wavelength $\lambda$ of a mode propagating through the optical fiber (i.e., $1/\lambda$).

Also known as an indicator that indicates the proportion of a mode propagating through a core to a mode propagating through an optical fiber is normalized propagation constant B, which is defined by Equation (2).

$$B = \frac{\beta^2/k^2 - n_{cl}^2}{n_{co}^2 - n_{cl}^2} \quad (2)$$

In Equation (2), $\beta$ represents the propagation constant of the mode propagating through the optical fiber.

As shown in FIG. 2, the number of modes propagating through an optical fiber increases as the normalized frequency V of the optical fiber increases, and decreases as the normalized frequency V of the optical fiber decreases. That is, FIG. 2 indicates that, when the normalized frequency V is gradually reduced from "10", the modes LP42, LP13, LP61, LP32, LP51, LP03, LP22, LP41, LP12, and LP31 become unable to propagate through the optical fiber in the order named.

In a case where the normalized frequency V is less than 5.13 (when the number of significant figures is three), the modes that can propagate through the optical fiber are the following four modes: LP02, LP21, and LP11, which are higher-order modes; and LP01, which is the fundamental mode. In a case where the normalized frequency V is less than 3.83 (when the number of significant figures is three), the modes that can propagate through the optical fiber are the following two modes: the LP11 mode and the LP01 mode. In a case where the normalized frequency V is less than 2.40 (when the number of significant figures is three), the mode that can propagate through the optical fiber is only the LP01 mode.

It is apparent from above that, by designing an optical fiber so that the optical fiber has a desired normalized frequency V, it is possible to cause the optical fiber to allow propagation of only a desired number of modes.

The MMF 11 of Embodiment 1 is designed such that the normalized frequency V is not less than 3.83. Therefore, in a case where the MMF 11 is placed in a straight line along one direction, the MMF 11 allows propagation of at least the following four modes: LP01, LP11, LP21, and LP02.

<Beam Quality>

In a case where the fiber laser 1, which includes the optical amplifier 10, is used in material processing applications, the fiber laser 1 is required to output high-power laser light that has a small beam waist diameter (cross sectional diameter) in order to improve processing accuracy. That is, the optical amplifier 10 is required to output high-power laser light that has high beam quality. The beam quality is a general term for indicators measuring to what degree the beam waist diameter can be reduced. Beam parameter product (BPP) or $M^2$ can be used to indicate the beam quality. An indicator indicative of a beam quality may either be BPP or $M^2$.

Light is known to have the property that, in a light condensing system that condenses light emitted from one point light source, the light emitted from the light source cannot be condensed smaller than the size of the light source. Assuming a light condensing system that condenses light emitted from one end surface (exit end surface) of an optical fiber like the MMF 11, the exit end surface can be regarded as a kind of light source. In this case, the size (diameter) of an area, where light is distributed, of the exit end surface (such an area is referred to as "distribution area") can be regarded as the size of the light source. Therefore, in view of the above-described property of light, light emitted from the exit end surface cannot be condensed smaller than the size of the distribution area. The size of the distribution area varies depending on the mode of light.

With regard to modes propagating through the MMF 11 and the delivery fiber 15, when the mode that is distributed in a concentrated manner at and around the center of the core is compared with a mode that is distributed near the outer periphery of the core, the mode that is distributed in a concentrated manner at and around the center of the core is smaller in distribution area within the exit end surface. Therefore, when the mode that is distributed in a concentrated manner at and around the center of the core is compared with the mode that is distributed near the outer periphery of the core, the mode that is distributed in a concentrated manner at and around the center of the core can be condensed smaller than the mode that is distributed near the outer periphery of the core. That is, from the viewpoint of improving beam quality, the mode that is distributed in a concentrated manner at and around the center of the core is more advantageous than the mode that is distributed near the outer periphery of the core.

The following discusses a distribution of each mode propagating through a step-index optical fiber, with reference to FIG. 3. Normalized core radius on the horizontal axis of FIG. 3 is the distance from the center of the MMF 11 normalized to the radius a (a=13.5 µm in Embodiment 1) of the core. That is, the position at which the absolute value of the normalized core radius is 1 (that is, the position at which the normalized core radius is 1 or −1 in FIG. 3) corresponds to the boundary between the core and a cladding.

As shown in FIG. 3, the intensity of the fundamental mode LP01 has a local maximum at the center of the core, and the intensity monotonically decreases with increasing distance from the center of the core. As such, LP01 is distributed in a concentrated manner at and around the center of the core, and therefore can be condensed small. Therefore, from the viewpoint of improving beam quality, it is preferable that only the fundamental mode LP01 is selected as a mode propagating through the MMF 11 and the delivery fiber 15. Specifically, it is only necessary to set the normalized frequency V so that only LP01 propagates.

<Amplification Efficiency>

On the contrary, in a case where LP01 only is selected as a mode propagating through the MMF 11 and the delivery fiber 15, it is difficult to improve amplification efficiency of the MMF 11, for the following reason. Note that the amplification efficiency can be represented by, for example, the proportion of (1) the power of laser light outputted from the MMF 11 to (2) the power of excitation light supplied to the MMF 11.

As described earlier, LP01 is distributed in a concentrated manner at and around the center of the core. Therefore, rare earth ions that can contribute to amplification of LP01 are, among rare earth ions excited by excitation light, those which are distributed at and around the center of the core. Therefore, from the viewpoint of improving amplification efficiency, it is preferable that rare earth ions distributed at and around the center of the core are selectively excited.

However, in a case where, for example, a double cladding is employed as the core of the MMF 11, it is difficult to selectively excite the rare earth ions distributed at and around the center of the core. When the MMF 11 is in actual use, excitation light excites rare earth ions in the core regardless of their positions in distribution. Therefore, in a case where LP01 only is selected as a mode propagating through the MMF 11 and the delivery fiber 15, rare earth ions distributed near the outer periphery of the core cannot contribute to the amplification of LP01. That is, the power of excitation light used to excite the rare earth ions near the outer periphery of the core is dissipated uselessly, making it impossible to improve amplification efficiency.

FIG. 4 shows distributions of excitation state density in the MMF 11 that is having excitation light and seed light supplied thereto. The origin on the horizontal axis indicates the center of the core, and the position of 13.5 µm on the horizontal axis indicates the boundary between the core and the cladding. FIG. 5 shows correlations between the sum of excited states in the core and the number of modes propagating through the core (hereinafter referred to as the number of propagating modes). The sum of excited states is, in other words, the total number of rare earth ions remaining in their excited states.

In FIG. 4, as the excitation state density becomes high, the number of rare earth ions that have not yet contributed to amplification of light becomes large, that is, amplification efficiency decreases. It is apparent from FIG. 4 that, in a case where LP01 is the only mode propagating through the MMF 11, the excitation state density is high except at and around the center of the core (i.e., except a range of radii up to 5 µm) and that the power of excitation light is wasted.

Similarly, it is also apparent from FIG. 5 that, in a case where LP01 is the only mode propagating through the MMF 11, there are many rare earth ions in their excited states remaining in the core.

In view of above, in order to improve the efficiency of amplification of modes propagating through the MMF 11, Embodiment 1 employs the following modes propagating through the MMF 11: LP01, which is the fundamental mode; and LP11, LP21, and LP02, which are higher-order modes.

As shown in FIG. 3, each of the LP11 and LP21 modes has a local minimum at the center of the core and has a local maximum in a region where the normalized core radius is 0.5 or more and 0.75 or less. When the MMF 11 allows propagation of such modes each having a local maximum in a region that excludes the vicinity of the center of the core, rare earth ions distributed in the region that excludes the vicinity of the center of the core can also contribute to the amplification of light. Specifically, when the MMF 11 allows propagation of each of the LP11 and LP21 modes, it is possible to improve amplification efficiency substantially throughout the diameter of the core except for the center of the core, as shown in FIG. 4.

The LP02 mode has a local maximum at the center of the core and has another local maximum near the boundary between the core and the cladding, despite that the another local maximum is small. When the MMF 11 allows propagation of LP20 in addition to LP11 and LP21, it is possible to further improve amplification efficiency near the outer periphery of the core (i.e., in a range of radii of 8 µm and greater), as shown in FIG. 4.

It is apparent from FIG. 5 that, as the number of propagating modes increases from "1", the number of rare earth ions remaining in their excited states in the core monotonically decreases clearly. That is, it is possible to improve amplification efficiency.

Note, however, that, as the number of propagating modes increases, the number of rare earth ions remaining in their excited states in the core starts to behave like gradually approaching a fixed value. That is, if the number of propagating modes is too large, the amplification efficiency will reach a level of saturation. Furthermore, in a case where the number of propagating modes is five or more, this means that higher-order modes such as LP31 and LP12 are employed. The higher-order modes such as LP31 and LP12 are distributed intensely not only in the core but also in the cladding. This is not preferred also from the viewpoint of improving beam quality.

In consideration of above, Embodiment 1 employs, as the modes propagating through the MMF 11, not only LP01 but also LP11, LP21, and LP02, in order to improve the efficiency of amplification by rare earth ions while maintaining the beam quality of output light. Specifically, the MMF 11 in accordance with Embodiment 1 is arranged to allow propagation of the following four modes: LP01, LP11, LP21, and LP02. The following description discusses a configuration of the MMF 11 that allows propagation of these four modes.

(Configuration of MMF 11)

As described earlier, the MMF 11 in accordance with Embodiment 1 is a step-index optical fiber whose core is doped with rare earth ions acting as an excitation substance. Parameters of this MMF 11, such as the radius a of the core of the MMF 11, the refractive index $n_{co}$ of the core, the outer diameter of the cladding, and the refractive index $n_{cl}$ of the cladding, are set such that the normalized frequency V of the MMF 11 is not less than 3.83. Therefore, in a case where the MMF 11 is placed in a straight line along one direction, the MMF 11 allows propagation of at least the following four modes: LP01, LP11, LP21, and LP02. In other words, the MMF 11 can be arranged such that, when placed in a straight line, the MMF 11 allows propagation of higher-order modes such as LP31 and LP12 in addition to the above four modes.

As illustrated in FIG. 1, the MMF 11 includes: a filter portion 111 which is formed by bending a partial section of the MMF 111; and a remainder portion 112 which is obtained by coiling and bundling a remainder section other than the filter portion 111. Note that the partial section, where the filter portion 111 is located, of the MMF 11 may be any section, provided that the section is part of the MMF 11. Specifically, the partial section of the MMF may be (1) a section that includes the vicinity of the entrance end of the MMF 11 but does not include the vicinity of the exit end of the MMF 11 as illustrated in FIG. 1, (2) a section that includes the vicinity of the exit end of the MMF 11 but does not include the vicinity of the entrance end of the MMF 11, or (3) a section that includes neither the vicinity of the entrance end of the MMF 11 nor the vicinity of the exit end of the MMF 11. A diameter R2 of the remainder portion 112 is not limited to a particular diameter, but is preferably greater than the largest one of diameters R1 (described later).

In Embodiment 1, the filter portion 111 is obtained by winding the partial section of the MMF 11 two or more turns (three turns in Embodiment 1, see FIG. 1) substantially in circles. That is, the filter portion 111 is obtained by coiling and bundling the partial section of the MMF 11. Note that the number of turns of the partial section of the MMF 11 arranged in circles may be one or two or more. The number can be set to any number. In the present specification, the partial section of the MMF 11 turned to form a circle is referred to as being in a loop form, whereas the partial section of the MMF 11 wound in circles is referred to as being in a coil form. In the filter portion 111, the shape of the partial section of the MMF 11 in a bent state (the shape is hereinafter referred to as the shape of the filter portion 111) is not limited to a circle, and may be an arc that forms a part of a circle (e.g., semicircle) and that is defined by a central angle of less than 360°.

The shape of the filter portion 111 in accordance with Embodiment 1 is a circle, and therefore the diameter of the filter portion 111 is defined by the diameter of the circle. The diameter R1 of the filter portion 111 in accordance with Embodiment 1 is constant throughout the filter portion 111. Therefore, the smallest diameter and the largest diameter of the filter portion 111 are both the diameter R1. The smallest diameter and the largest diameter mean the smallest diameter and the largest diameter of the filter portion 111 in a coil form (the number of turns is two or more), respectively. The diameter R1 is set so that only LP01, LP11, LP21, and LP02 propagate and that the loss of LP02 is not more than 0.1 dB/m. Note that, even in a case where the shape of the filter portion 111 is an arc, the diameter of the filter portion 111 can be defined as below. Specifically, assuming an imaginary circle that corresponds to the curvature of a curve that constitutes the arc, the diameter of the imaginary circle may be used as the diameter of the arc. In a case where the curvature of the arc (the reciprocal of the radius of the arc) is not constant, the smallest diameter of the filter portion 111 may be obtained by: (1) selecting an infinitesimal segment with the largest curvature from infinitesimal segments that constitute the arc and (2) using the diameter of an imaginary circle that corresponds to the selected infinitesimal segment as the smallest diameter of the filter portion 111.

According to the above arrangement, the MMF 11 allows propagation of not only LP01 but also LP11, LP21, and LP02, and thereby makes it possible to improve the amplification efficiency of the MMF 11. Furthermore, since higher-order modes that strongly pass into the cladding during propagation, such as LP31 and LP12, are not allowed to propagate, the beam quality does not lower too much even in comparison with when LP01 only is allowed to propagate. Thus, the MMF 11 is capable of improving the efficiency of amplification by rare earth ions while maintaining the beam quality of output light. That is, it is possible to achieve both the beam quality of output light and the amplification efficiency. Furthermore, the bend loss (the loss recited in the claims) of LP02 is not more than 0.1 dB/m, and therefore the bend loss of each of the LP01, LP11, and LP21 modes is also not more than 0.1 dB/m (this will be described later in detail with reference to FIG. 6). Thus, the MMF 11 is capable of preventing increases in bend loss that would result from the presence of the filter portion 111.

Note that, when a comparison is made between a case where the shape of the filter portion 111 is a circle and a case where the shape of the filter portion 111 is an arc, the case where the shape of the filter portion 111 is a circle allows a longer length of the filter portion 111 to be stored in a limited space. This makes it unnecessary to reduce the smallest diameter of the filter portion 111 too much. It follows that the bend loss of each of the LP01, LP11, LP21, and LP02 modes can be made smaller than when the shape of the filter portion 111 is an arc. For similar reasons, when a comparison is made between a case where the number of turns of the coiled filter portion 111 that is in the shape of a circle is small and a case where the number of turns is large, the case where the number of turns is large is greater in length of the filter portion 111. As such, the bend loss can be reduced to a greater extent and the beam quality can be improved to a greater extent when the number of turns is larger.

As described earlier, the diameter R1 is set so that only the LP01, LP11, LP21, and LP02 modes propagate and that the loss of LP02 is not more than 0.1 dB/m. When a comparison is made between a case where the diameter R1 is large and a case where the diameter R1 is small while ensuring that the above conditions are satisfied, the proportion of the LP01 mode to the sum of the LP01, LP11, LP21, and LP02 modes increases as the diameter R1 decreases. When the proportion of the LP01 mode increases, the beam quality of output light further improves, but amplification efficiency degrades. In view of this, the diameter R1 can be set appropriately according to which of the beam quality and amplification efficiency is given a higher priority while ensuring that the above conditions are satisfied.

Note that, when the bend loss of each of the LP02, LP01, LP11, and LP21 modes is as small as not more than 0.1 dB/m, this means that no or little of the LP02, LP01, LP11, and LP21 modes leaks from the core into the cladding. Thus, according to this arrangement, it is possible to prevent or reduce the loss of output light. That is, it is possible to provide higher-power output light.

There may also be a circumstance where a mode that has leaked from the core into the cladding propagates through the cladding, is reflected at a fusion splice point such as the junction point P11 to become back-reflected light, and the back-reflected light enters the LDs 121 to 126. In a case where the amount of the back-reflected light that enters the LDs 121 to 126 is too large, the LDs 121 to 126 may experience unfavorable influences, for example, the operation of the LDs 121 to 126 may become unstable or the reliability of the LDs 121 to 126 may degrease. When the bend loss of each of the LP02, LP01, LP11, and LP21 modes is as smalls as not more than 0.1 dB/m, no or little of the LP02, LP01, LP11, and LP21 modes leaks from the core into the cladding. This makes it possible to eliminate or reduce the likelihood that the LDs 121 to 126 will experience the foregoing unfavorable influences.

When the bend loss of each of the LP02, LP01, LP11, and LP21 modes is large, this means that each of the LP02, LP01, LP11, and LP21 modes, which are components of output light, leaks from the core into the cladding, and that the loss of output light increases. Each of the LP02, LP01, LP11, and LP21 modes, which has leaked from the core into the cladding, propagates through the cladding to reach the LDs 121 to 126, and would unfavorably influence the LDs 121 to 126. When the bend loss of each of the LP02, LP01, LP11, and LP21 modes is not more than 0.1 dB/m, the loss of output light can be reduced and the unfavorable influences that would be imposed on the LDs 121 to 126 can be reduced.

One way to improve the beam quality of output light would be to employ an optical fiber that has a small core diameter (e.g., a single-mode fiber (SMF)) as an amplifier fiber. However, although such an arrangement makes it possible to improve beam quality, this arrangement makes it difficult to improve amplification efficiency. This is because the fundamental mode, which propagates through the core of the SMF, is concentrated at and around the center of the core. Since the fundamental mode is concentrated at and around the center of the core, the power of excitation light that has excited rare earth ions located near the outer periphery of the core of an excitation optical fiber, which is part of the power of excitation light that has entered the SMF, is dissipated uselessly without contributing to the amplification of signal light.

It should be noted here that the MMF 11 is an MMF that is arranged such that the normalized frequency V is not less than 3.83, and therefore has a larger core diameter than an SMF. Since the MMF 11 has a larger core diameter than an SMF, the MMF 11 is capable of guiding not only the fundamental mode LP01 but also predetermined higher-order modes (LP11, LP21, and LP02). Therefore, the higher-order modes are more likely to be excited, and thereby not only $Yb^{3+}$ ions located at and around the center of the core but also $Yb^{3+}$ ions located near the outer periphery of the core more likely to contribute to the amplification of output light. This makes it possible to reduce the likelihood that the power of excitation light that was used to excite $Yb^{3+}$ ions distributed near the outer periphery of the core, which is part of the power of excitation light that entered the MMF 11, will be dissipated uselessly. Thus, the MMF 11 is capable of achieving both the beam quality of output light and the amplification efficiency.

Furthermore, by employing a filter portion 111 that is formed by winding a partial section of the MMF 11 into a coil form, it is possible to set the length of the section that constitutes the filter portion 111 to any length without changing the size of the filter portion 111. Furthermore, this arrangement allows for compact storage of the MMF 11 even in a case where the MMF 11 employed by the optical amplifier 10 is a long MMF. Accordingly, it is possible to achieve a compact optical amplifier 10 and a compact fiber laser 1.

Furthermore, it is preferable that the filter portion 111 is positioned upstream of the remainder portion 112, as illustrated in FIG. 1. That is, it is preferable that, assuming that one end, which receives incoming seed light (this end is the junction point P11-side end), of the opposite ends of the MMF 11 is the entrance end, the filter portion 111 is formed by winding, into a coil form, a partial section that includes the vicinity of the entrance end.

This arrangement makes it possible to eliminate, in a section of the MMF 11 that is relatively close to the junction point P11, higher-order modes other than LP11, LP21, and LP02 from higher-order modes that are contained in the seed light supplied to the MMF 11. Therefore, in the remainder portion 112, rare earth ions in their excited states amplify only the following four modes: LP01, LP11, LP21, and LP02. This makes it possible to prevent the amplification of higher-order modes such as LP31 and LP12 and thus possible to further improve amplification efficiency.

[Variation of MMF 11]

In Embodiment 1, the diameter R1 is set so that only LP01, LP11, LP21, and LP02 propagate and that the loss of LP02 is not more than 0.1 dB/m. Note, however, that in a case where a higher priority is given to beam quality than to amplification efficiency while ensuring certain levels of both the beam quality and amplification efficiency, the diameter R1 may be set so that only LP01 and LP propagate and that the loss of LP11 is not more than 0.1 dB/m. In this case, it is only necessary that the MMF 11 be arranged such that the normalized frequency V is not less than 2.40.

Note that this variation can be applied not only to the MMF 11 in accordance with Embodiment 1 but also to an MMF 21 in accordance with Embodiment 2 and an MMF 51 in accordance with Embodiment 3.

(Reason Why Backward-Pumping Arrangement can Prevent or Reduce Amplified Spontaneous Emission)

As described earlier, a backward-pumping arrangement that employs the optical amplifier 10 is capable of reducing the occurrence of amplified spontaneous emission as compared to a forward-pumping arrangement. A reason therefor is as follows.

In a case where a backward-pumping arrangement is employed, signal light is inputted to the MMF 11 via the junction point P11 and excitation light is inputted to the MMF 11 via the junction point P12, as illustrated in FIG. 1. When seen in a direction of extension of the MMF 11, that is, when seen in the direction from the junction point P11 to the junction point P12 or when seen in the direction from the junction point P12 to the junction point P11, the power of excitation light is distributed such that the power is highest at the junction point P12, attenuates with increasing distance from the junction point P12, and is lowest at the junction point P11. This is because the excitation light propagates through the MMF 11 from the junction point P12 toward the junction point P11. Note here that the energy of excitation light is absorbed by $Yb^{3+}$ ions. It follows that the energy stored in the $Yb^{3+}$ ions is distributed such that the energy is highest at the junction point P12, attenuates with increasing distance from the junction point P12, and is lowest at the junction point P11.

On the contrary, when seen in the direction of extension of the MMF 11, the power of signal light is distributed such that the power is lowest at the junction point P11, is amplified with increasing distance from the junction point P11, and is highest at the junction point P12. This is because the power of signal light is amplified by the energy stored in the Yb$^{3+}$ ions as the signal light propagates through the MMF 11 from the junction point P11 toward the junction point P12.

As described above, when seen in the direction of extension of the MMF 11, a distribution of energy stored in Yb$^{3+}$ ions and a distribution of the power of signal light show the same tendency. There is therefore a tendency that, in a backward-pumping arrangement, the energy remaining in Yb$^{3+}$ ions is uniform in the direction of extension of the MMF 11. That is, it is possible to eliminate or reduce the likelihood that the energy remaining in Yb$^{3+}$ ions will be high locally, and thus possible to prevent or reduce the occurrence of amplified spontaneous emission.

On the contrary, in a case where a forward-pumping arrangement is employed, signal light and excitation light are inputted to the MMF 11 via the same junction point. If the optical amplifier 10 illustrated in FIG. 1 employed a forward-pumping arrangement, most of the signal light and excitation light would be inputted to the MMF 11 via the junction point P11. Accordingly, the power of the excitation light would be distributed such that the power is highest at the junction point P11, attenuates with increasing distance from the junction point P11, and is lowest at the junction point P12. As a result, the energy stored in Yb$^{3+}$ ions would be distributed such that the energy is highest at the junction point P11, attenuates with increasing distance from the junction point P11, and is lowest at the junction point P12.

On the contrary, the power of signal light would be distributed such that the power is lowest at the junction point P11, is amplified with increasing distance from the junction point P11, and is highest at the junction point P12.

As described above, when seen in the direction of extension of the MMF 11, a distribution of energy stored in Yb$^{3+}$ ions and a distribution of the power of signal light show opposite tendencies. Therefore, in a forward-pumping arrangement, the energy remaining in Yb$^{3+}$ ions is highest at the junction point P11 and decreases with increasing distance from the junction point P11. It follows that amplified spontaneous emission is highly likely to occur in the vicinity of the junction point P11.

Example 1

Figure 6:
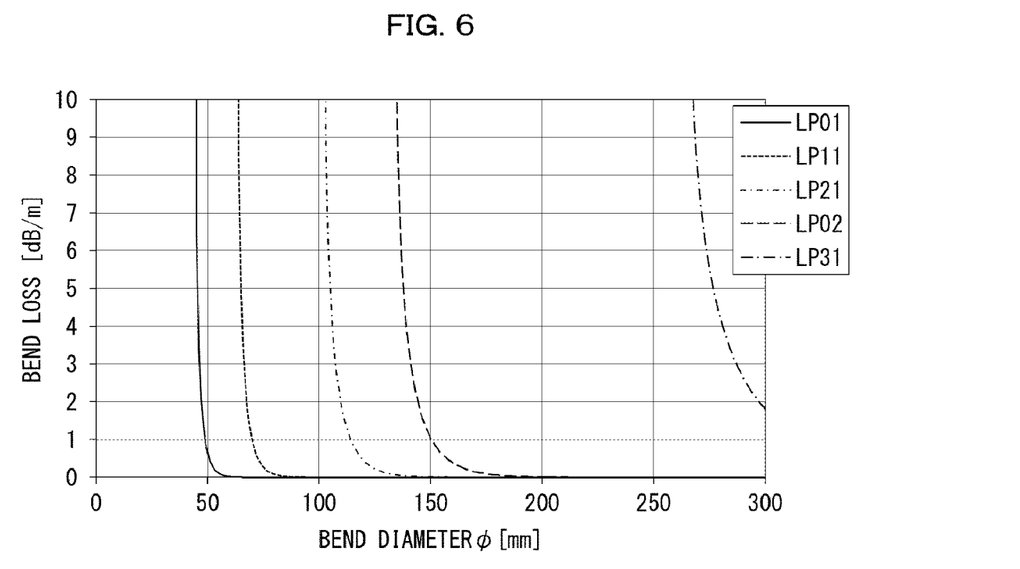
FIG. 6 is a chart showing bend losses of respective propagating modes obtained by varying the bend diameter of a multi-mode fiber which is Example 1.

The following description will discuss an MMF 11 that is Example 1 of the present invention, with reference to FIG. 6. FIG. 6 is a chart showing bend losses of respective propagating modes obtained by varying the bend diameter of the MMF 11 of Example 1.

In Example 1, the core radius a of the MMF 11 employed was 13.5 μm, the refractive index $n_{co}$ of the core employed was 1.451, the outer diameter of the cladding employed was 250 μm, and the refractive index $n_{cl}$ of the cladding employed was 1.449. Accordingly, the normalized frequency V of the MMF 11 was 5.98.

Furthermore, the total length of the MMF 11 employed was 10 m and the length of the filter portion 111 employed was 1 m.

The bend losses shown in FIG. 6 were calculated using the MMF 11 arranged as described above. FIG. 6 indicates that, by setting the diameter R1 of the filter portion 111 to not less than 174 mm and less than 264 mm, it is possible to configure the MMF 11 so that only LP01, LP11, LP21, and LP02 propagate through the MMF 11 and that the bend loss of LP02 is not more than 0.1 dB/m.

FIG. 6 also indicates that, by setting the diameter R1 of the filter portion 111 to not less than 79 mm and less than 102 mm, it is possible to configure the MMF 11 so that only LP01 and LP11 propagate through the MMF 11 and that the bend loss of LP11 is not more than 0.1 dB/m.

Note that the description in Embodiment 1 discusses the MMF 11 based on a MOPA (Master Oscillator—Power Amplifire)—type fiber laser 1; however, the fiber laser that employs the MMF 11 is not limited to a MOPA-type fiber laser, and may be a resonator-type fiber laser.

Example 2

Figure 7:
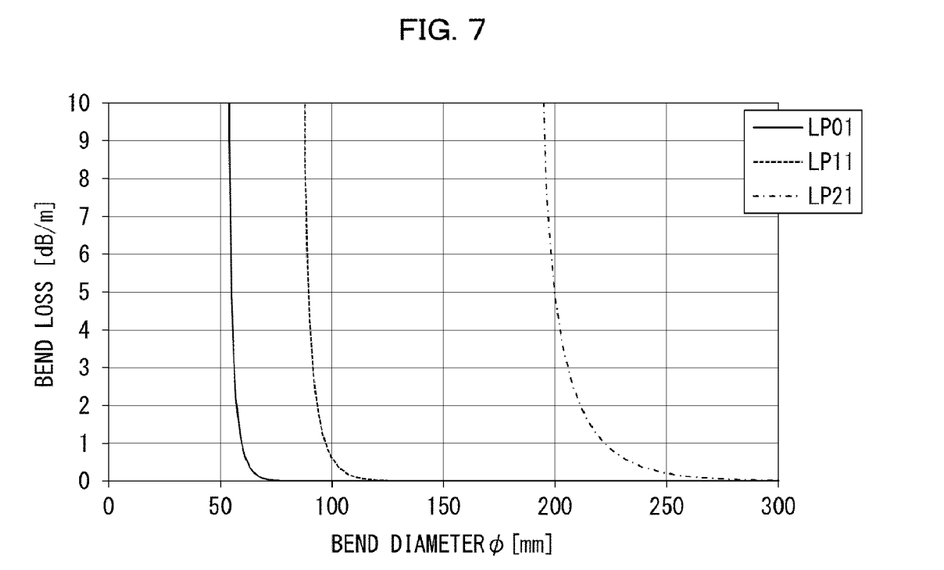
FIG. 7 is a chart showing bend losses of respective propagating modes obtained by varying the bend diameter of a multi-mode fiber which is Example 2.

The following description will discuss an MMF 11 that is Example 2 of the present invention, with reference to FIG. 7. FIG. 7 is a chart showing bend losses of respective propagating modes obtained by varying the bend diameter of the MMF 11 of Example 2.

In Example 2, the core radius a of the MMF 11 employed was 12.5 μm, the refractive index $n_{co}$ of the core employed was 1.451, the outer diameter of the cladding employed was 250 μm, and the refractive index $n_{cl}$ of the cladding employed was 1.449. Accordingly, the normalized frequency V of the MMF 11 was 5.12.

Furthermore, the total length of the MMF 11 employed was 10 m, and the length of the filter portion 111 employed was 1 m.

The bend losses shown in FIG. 7 were calculated using the MMF 11 arranged as described above. FIG. 7 indicates that, by setting the diameter R1 of the filter portion 111 to not less than 111 mm and less than 192 mm, it is possible to configure the MMF 11 so that only LP01 and LP11 propagate through the MMF 11 and that the bend loss of LP11 is not more than 0.1 dB/m.

Embodiment 2

The following description will discuss a multi-mode fiber (MMF) in accordance with Embodiment 2 of the present invention with reference to FIG. 8. FIG. 8 is a block diagram illustrating a configuration of the seed light source 20 that includes an MMF 21 in accordance with Embodiment 2.

The seed light source 20 is part of the fiber laser 1 discussed in Embodiment 1, and serves to supply seed light to the optical amplifier 10. The seed light source 20 is an example of the optical amplifier recited in the claims.

As illustrated in FIG. 8, the seed light source 20 includes an MMF 21, an excitation light source group 22, an optical fiber group 23, a combiner 24, fiber gratings (Fiber Bragg Gratings: FBGs) 25 and 26, and an optical fiber 27. The excitation light source group 22 is made up of a plurality of laser diodes (LDs) 221 to 227 which are a plurality of excitation light sources. The optical fiber group 23 is made up of a plurality of optical fibers 231 to 237.

Similarly to the MMF 11, the MMF 21 is a step-index optical fiber that includes a core and a cladding, and the core is doped with rare earth ions (YB$^{3+}$ ions in Embodiment 2) that act as excitation substance. The MMF 21 is a multi-mode fiber that allows propagation of not only the fundamental mode LP01 but also at least one higher-order mode. One end of the MMF 21 is fusion-spliced to the other end of the combiner 24 at a junction point P22. The one end of the MMF 21 is referred to as entrance end, whereas the other end of the MMF 21 is referred to as exit end.

The exit end of the MMF 21 is fusion-spliced to one end of the optical fiber 27 at a junction point P23. The other end of the optical fiber 27 is fusion-spliced to the optical amplifier 10 at the junction point P11 as illustrated in FIG. 1.

One end of the optical fiber 231 is optically coupled to the LD 221, and the other end of the optical fiber 231 is fusion-spliced to one end of the combiner 24 at a junction point P21. Similarly, one end of each of the optical fibers 232 to 237 is optically coupled to a corresponding one of the LDs 222 to 227. The other end of each of the optical fiber 232 to 237 is fusion-spliced to the one end of the combiner 24 at the junction point P21. As such, the seed light source 20 employs a forward-pumping arrangement. Note, however, that a seed light source in accordance with an aspect of the present invention is not limited to such a forward-pumping arrangement, and may be a backward-pumping arrangement or a bidirectional-pumping arrangement.

In the seed light source 20 arranged like above, excitation light outputted by the LDs 221 to 227 is supplied to the entrance end of the MMF 21 via the optical fibers 231 to 237 and the combiner 24. The excitation light supplied to the MMF 21, as with the case of the MMF 11, excites a large number of rare earth ions in the core.

Electrons of rare earth ions in their excited states will eventually undergo radiative recombination. The radiative recombination of any of the rare earth ions will trigger a stimulated emission within the MMF 21.

The FBG 25 resides between the junction point P22 and a filter portion 211 of the MMF 21. Similarly, the FBG 26 resides between the junction point P23 and the filter portion 211 of the MMF 21. Therefore, the MMF 21, which resides between the FBG 25 and the FBG 26, functions as a resonator. It follows that the MMF 21 outputs seed light, which is laser light, through its exit end.

In Embodiment 2, the MMF 21 is arranged such that the normalized frequency V is not less than 3.83, as with the case of the MMF 11. The MMF 21 is the same as the MMF 11 in that the MMF 21 includes the filter portion 211 that is formed by bending a partial section of the MMF 21. The filter portion 211 of the MMF 21, however, is different from the filter portion 111 of the MMF 11 in that the filter portion 211 is formed by winding, into a coil form, a middle section of the MMF 21 which is a section that extends from the vicinity of the entrance end of the MMF 21 to the vicinity of the exit end of the MMF 21 (see FIG. 8). Note that the middle section, where the filter portion 211 is located, of the MMF 21 is a section that extends from the vicinity of the entrance end (i.e., one end) of the MMF 21 to the vicinity of the exit end (i.e., the other end) of the MMF 21, as illustrated in FIG. 8. The middle section can be expressed as (1) a section that excludes the entrance end and the exit end of the MMF 21 or (2) a section that extends from the FBG 26-side end of the FBG 25 to the FBG 25-side end of the FBG 26 of the MMF 21 as illustrated in FIG. 8. The middle section is obtained by arranging a partial section, which is part of the MMF 21, such that the section extends toward the entrance end and the exit end so as to include the vicinity of the entrance end and the vicinity of the exit end. Thus, the middle section of the MMF 21 is longer than the partial section of the MMF. That is, the middle section spatially includes the partial section. On the contrary, the middle section is conceptually subordinate to the partial section. The spatial and conceptual relationships between the middle section and the partial section apply also to the MMF 11 illustrated in FIG. 1 and the MMF 51 illustrated in FIG. 9.

A diameter R211 of the filter portion 211 is constant throughout the filter portion 211. Therefore, the smallest diameter and the largest diameter of the filter portion 211 are both the diameter R211. The diameter R211 is set so that only LP01, LP11, LP21, and LP02 propagate and that the loss of LP02 is not more than 0.1 dB/m.

The MMF 21 in accordance with Embodiment 2 is, as with the case of the MMF 11 illustrated in FIG. 1, capable of improving the efficiency of amplification by rare earth ions while maintaining the beam quality of output light. Furthermore, by winding the entirety of the middle section into a coil form, it is possible to make the MMF 21 more compact than the MMF 11 that includes the remainder portion 112.

Embodiment 3

The following description will discuss a multi-mode fiber (MMF) in accordance with Embodiment 3 of the present invention with reference to FIG. 9. FIG. 9 is a block diagram illustrating a configuration of an optical amplifier 50 that includes an MMF 51 in accordance with Embodiment 3.

The optical amplifier 50 is different from the optical amplifier 10 illustrated in FIG. 1 in that the optical amplifier 50 includes the MMF 51 in place of the MMF 11. That is, the optical amplifier 50 is the same in configuration as the optical amplifier 10 except for the MMF 51.

Specifically, as illustrated in FIG. 9, the optical amplifier 50 includes the MMF 51, an excitation light source group 52, an optical fiber group 53, a combiner 54, and a delivery fiber 55. The excitation light source group 52 is made up of a plurality of laser diodes (LDs) 521 to 526 which are a plurality of excitation light sources. The optical fiber group 53 is made up of a plurality of optical fibers 531 to 536.

The excitation light source group 52, the optical fiber group 53, the combiner 54, and the delivery fiber 55, which are included in the optical amplifier 50, correspond to the excitation light source group 12, the optical fiber group 13, the combiner 14, and the delivery fiber 15, which are included in the optical amplifier 10, respectively. Therefore, the description in Embodiment 3 only discusses the MMF 51.

The MMF 51 is different from the MMF 21 illustrated in FIG. 8 in that the MMF 51 does not include the FBGs 25 and 26. Specifically, the MMF 51 is a step-index optical fiber that includes a core and a cladding, and the core is doped with rare earth ions ($YB^{3+}$ ions in Embodiment 3) that act as an excitation substance.

The MMF 51 is, as with the case of the MMFs 11 and 21, arranged such that the normalized frequency V is not less than 3.83. The MMF 51 includes a filter portion 511, which is formed by bending a middle section that extends from the vicinity of the entrance end (junction point P52-side end, or one end) of the MMF 51 to the vicinity of the exit end (junction point P53-side end, or the other end) of the MMF 51. A diameter R511 of the filter portion 511 is constant throughout the filter portion 511. Therefore, the smallest diameter and the largest diameter of the filter portion 511 are both the diameter R511. The diameter R511 is set so that only LP01, LP11, LP21, and LP02 propagate and that the loss of LP02 is not more than 0.1 dB/m.

The MMF 51 in accordance with Embodiment 3 is, as with the case of the MMF 11 illustrated in FIG. 1, capable of improving the efficiency of amplification by rare earth ions while maintaining the beam quality of output light. Furthermore, by winding the entirety of the middle section into a coil form, it is possible to make the MMF 51 more compact than the MMF 11 that includes the remainder portion 112.

Aspects of the present invention can also be expressed as follows:

A multi-mode fiber (11, 21, 51) in accordance with a first aspect of the present invention is a multi-mode fiber (11, 21, 51) that includes a rare-earth-ion-doped core and that has a normalized frequency of not less than 2.40, the multi-mode fiber (11, 21, 51) including a filter portion (111, 211, 511) that is formed by bending a partial section of or entirety of the multi-mode fiber (11, 21, 51), the filter portion (111, 211, 511) having a smallest diameter that is set so that (1) only LP01, LP11, LP21, and LP02 modes propagate or only LP01 and LP11 modes propagate and (2) a loss of a highest-order one of the modes that propagate is not more than 0.1 dB/m.

According to the above arrangement, not only the fundamental mode LP01, but also (1) the LP11, LP21, and LP02 modes or (2) the LP11 mode, propagates through the core of the multi-mode fiber. This makes it possible to improve the amplification efficiency of the multi-mode fiber. Furthermore, since an arrangement in which only a predetermined one(s) of the higher-order modes propagate(s) is employed, beam quality is prevented from deteriorating too much. Thus, the multi-mode fiber makes it possible to improve the efficiency of amplification by rare earth ions while maintaining the beam quality of output light.

The multi-mode fiber (11, 21, 51) in accordance with a second aspect of the present invention is preferably arranged such that: the normalized frequency of the multi-mode fiber (11, 21, 51) is not less than 3.83; and the smallest diameter of the filter portion (111, 211, 511) is set so that only the LP01, LP11, LP21, and LP02 modes propagate and that a loss of the LP02 mode is not more than 0.1 dB/m.

According to the above arrangement, not only the LP01 mode but also the LP11, LP21, and LP02 modes propagate through the multi-mode fiber. This makes it possible to improve the amplification efficiency as compared to a case where the LP01 and LP11 modes propagate through the multi-mode fiber. Therefore, in a case where a higher priority is given to the amplification efficiency while ensuring certain levels of both the beam quality of output light and amplification efficiency, the smallest diameter of the filter portion may be configured as described above.

The multi-mode fiber (11, 21, 51) in accordance with a third aspect of the present invention is preferably arranged such that the smallest diameter of the filter portion (111, 211, 511) is set so that only the LP01 and LP11 modes propagate and that a loss of the LP11 mode is not more than 0.1 dB/m.

According to the above arrangement, only the LP01 and LP11 modes propagate through the multi-mode fiber. This makes it possible to improve the beam quality as compared to a case where the LP01, LP11, LP21, and LP02 modes propagate through the multi-mode fiber. Therefore, in a case where a higher priority is given to the beam quality while ensuring certain levels of both the beam quality of output light and amplification efficiency, the smallest diameter of the filter portion may be configured as described above.

The multi-mode fiber (11, 21, 51) in accordance with a fourth aspect of the present invention is preferably arranged such that the filter portion (111, 211, 511) is formed by winding at least a partial section of the multi-mode fiber (11, 21, 51) into a loop form or a coil form.

According to the above arrangement, the length of a section that constitutes the filter portion can be set to any length by changing the number of turns of the loop or the coil, without having to change the size of the filter portion.

An optical amplifier (10, 50) in accordance with a fifth aspect of the present invention includes: a multi-mode fiber (11, 21, 51) of any one of the above aspects; and one or more excitation light sources (121-126, 221-227, 521-526) configured to supply excitation light to the multi-mode fiber (11, 21, 51).

An optical amplifier that includes a multi-mode fiber in accordance with one of the foregoing aspects of the present invention, like that described above, is also encompassed in the scope of the present invention. The optical amplifier provides similar effects to those provided by the multi-mode fiber in accordance with one of the foregoing aspects of the present invention.

The optical amplifier (10, 50) in accordance with a sixth aspect of the present invention is preferably arranged such that: the multi-mode fiber (11, 51) has opposite ends, one of the opposite ends being arranged to receive incoming seed light and serving as an entrance end; and the filter portion (111, 511) is formed by winding a partial section, which includes a vicinity of the entrance end, into a loop form or a coil form.

According to the above arrangement, higher-order modes other than the LP11, LP21, and LP02 modes, among the higher-order modes propagating through the multi-mode fiber, are removed in an early stage in the multi-mode fiber. Accordingly, in a later stage in the multi-mode fiber excluding the filter portion, rare earth ions in their excited states amplify only the following four modes: LP01, LP11, LP21, and LP02. Therefore, in the later stage in the multi-mode fiber, higher-order modes such as LP31 and LP12 are prevented from being amplified. As such, the optical amplifier is capable of further improving the amplification efficiency.

The optical amplifier (50) in accordance with a seventh aspect of the present invention is preferably arranged such that: the other of the opposite ends, which is opposite from the entrance end, of the multi-mode fiber (51) serves as an exit end; and the filter portion (511) is formed by winding a middle section into a coil form, the middle section being a section that extends from the vicinity of the entrance end of the multi-mode fiber (51) to a vicinity of the exit end of the multi-mode fiber (51).

According to the above arrangement, the entirety of the middle section is wound in a coil form. This makes it possible to make the optical amplifier more compact.

A fiber laser (1) in accordance with an eighth aspect of the present invention includes: an optical amplifier (10, 50) of any one of the foregoing aspects; and a seed light source (20) configured to supply seed light to the multi-mode fiber (11, 51).

A fiber laser that includes an optical amplifier in accordance with one of the foregoing aspects of the present invention, like that described above, is also encompassed in the scope of the present invention. The fiber laser provides similar effects to those provided by the optical amplifier in accordance with one of the foregoing aspects of the present invention.

The fiber laser (1) in accordance with a ninth aspect of the present invention may be arranged such that: the multi-mode fiber (11, 21, 51) has opposite ends, one of the opposite ends being arranged to receive incoming seed light and the other of the opposite ends serving as an exit end; and the one or more excitation light sources (121-126, 221-227, 521-526) are coupled to the exit end.

The fiber laser makes it possible to prevent or reduce the occurrence of amplified spontaneous emission. Therefore, even in a case where a backward-pumping arrangement is employed, it is possible to prevent or reduce failures that would occur in a plurality of excitation light sources.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST 1 fiber laser
10, 50 optical amplifier
20 seed light source
11, 21, 51 multi-mode fiber (MMF)
111, 211, 511 filter portion
112 remainder portion
12, 22, 52 excitation light source group
121-126, 221-227, 521-526 LD (excitation light source)
13, 23, 53 optical fiber group
131-136, 231-237, 531-536 optical fiber
14, 24, 54 combiner
15, 55 delivery fiber
25, 26 fiber grating (FBG, Fiber Bragg Grating)
27 optical fiber
30 head

The invention claimed is:

1. A multi-mode fiber that comprises a rare-earth-ion-doped core and that has a normalized frequency of not less than 2.40,
the multi-mode fiber comprising a filter portion that is formed by bending a partial section of the multi-mode fiber,
the filter portion having a smallest diameter of a bend of the filter portion that is set so that (1) only LP01, LP11, LP21, and LP02 modes propagate or only LP01 and LP11 modes propagate and (2) a loss of a highest-order one of the modes that propagate is not more than 0.1 dB/m,
wherein the multi-mode fiber comprises a remainder portion that is formed by bending a partial section of the multi-mode fiber,
the filter portion is positioned on an upstream side of the remainder portion,
the smallest diameter of the bend of the filter portion is smaller than the smallest diameter of a bend of the remainder portion.

2. The multi-mode fiber as set forth in claim 1, wherein:
the normalized frequency of the multi-mode fiber is not less than 3.83; and
the smallest diameter of the bend of the filter portion is set so that only the LP01, LP11, LP21, and LP02 modes propagate and that a loss of the LP02 mode is not more than 0.1 dB/m.

3. The multi-mode fiber as set forth in claim 1, wherein the smallest diameter of the bend of the filter portion is set so that only the LP01 and LP11 modes propagate and that a loss of the LP11 mode is not more than 0.1 dB/m.

4. The multi-mode fiber as set forth in claim 1, wherein the filter portion is formed by winding at least a partial section of the multi-mode fiber into a loop form or a coil form.

5. An optical amplifier comprising:
a multi-mode fiber recited in claim 1; and
one or more excitation light sources configured to supply excitation light to the multi-mode fiber.

6. The optical amplifier as set forth in claim 5, wherein:
the multi-mode fiber has opposite ends, one of the opposite ends being arranged to receive incoming seed light and serving as an entrance end; and
the filter portion is formed by winding a partial section, which includes a vicinity of the entrance end, into a loop form or a coil form.

7. The optical amplifier as set forth in claim 6, wherein:
the other of the opposite ends, which is opposite from the entrance end, of the multi-mode fiber serves as an exit end; and
the filter portion is formed by winding a middle section into a coil form, the middle section being a section that extends from the vicinity of the entrance end of the multi-mode fiber to a vicinity of the exit end of the multi-mode fiber.

8. A fiber laser comprising:
an optical amplifier recited in claim 5; and
a seed light source configured to supply seed light to the multi-mode fiber.

9. The fiber laser as set forth in claim 8, wherein:
the multi-mode fiber has opposite ends, one of the opposite ends being arranged to receive incoming seed light and the other of the opposite ends serving as an exit end; and
the one or more excitation light sources are coupled to the exit end.

10. The optical amplifier as set forth in claim 1, wherein:
the multi-mode fiber has opposite ends, one of the opposite ends being arranged to receive incoming seed light and serving as an entrance end,
the filter portion is positioned on an entrance-end side of the remainder portion.

* * * * *